United States Patent
Kesavan et al.

(10) Patent No.: US 11,188,266 B2
(45) Date of Patent: Nov. 30, 2021

(54) WRITE ORDERING FOR PERSISTENT MEMORY

(71) Applicant: NetApp Inc., Sunnyvale, CA (US)

(72) Inventors: Ram Kesavan, Los Altos, CA (US); Matthew Fontaine Curtis-Maury, Apex, NC (US); Abdul Basit, Morrisville, NC (US); Vinay Devadas, Apex, NC (US); Ananthan Subramanian, San Ramon, CA (US)

(73) Assignee: NetApp Inc., San Jose, CA (US)

( * ) Notice: Subject to any disclaimer, the term of this patent is extended or adjusted under 35 U.S.C. 154(b) by 38 days.

(21) Appl. No.: 16/852,580

(22) Filed: Apr. 20, 2020

(65) Prior Publication Data

US 2021/0326065 A1 Oct. 21, 2021

(51) Int. Cl.
*G06F 12/00* (2006.01)
*G06F 3/06* (2006.01)
*G06F 11/14* (2006.01)

(52) U.S. Cl.
CPC ............ *G06F 3/0659* (2013.01); *G06F 3/067* (2013.01); *G06F 3/0619* (2013.01); *G06F 3/0644* (2013.01); *G06F 3/0653* (2013.01); *G06F 3/0683* (2013.01); *G06F 11/1417* (2013.01); *G06F 11/1464* (2013.01); *G06F 11/1469* (2013.01)

(58) Field of Classification Search
CPC ...... G06F 3/0659; G06F 3/0683; G06F 3/067; G06F 11/1469; G06F 11/1464; G06F 3/0644; G06F 11/1417; G06F 3/0619; G06F 3/0653
See application file for complete search history.

(56) References Cited

U.S. PATENT DOCUMENTS

| | | | |
|---|---|---|---|
| 7,657,578 B1* | 2/2010 | Karr | G06F 11/2069 707/610 |
| 9,075,708 B1* | 7/2015 | Kang | G06F 12/0246 |
| 9,734,157 B1* | 8/2017 | Raju | G06F 3/06 |
| 2006/0112261 A1* | 5/2006 | Yourst | G06F 9/3857 712/218 |
| 2009/0287703 A1* | 11/2009 | Furuya | G06F 16/2322 |
| 2012/0124337 A1* | 5/2012 | Hardage | G06F 9/384 712/208 |
| 2016/0350013 A1* | 12/2016 | Aron | G06F 12/08 |
| 2016/0378495 A1* | 12/2016 | Burger | G06F 9/38 712/205 |
| 2020/0065399 A1* | 2/2020 | Desai | G06F 16/2246 |

* cited by examiner

*Primary Examiner* — John A Lane
(74) *Attorney, Agent, or Firm* — Cooper Legal Group, LLC

(57) ABSTRACT

Techniques are provided for implementing write ordering for persistent memory. A set of actions are identified for commitment to persistent memory of a node for executing an operation upon the persistent memory. An episode is created to comprise a first subset of actions of the set of actions that can be committed to the persistent memory in any order with respect to one another such that a consistent state of the persistent memory can be reconstructed in the event of a crash of the node during execution of the operation. The first subset of actions within the episode are committed to the persistent memory and further execution of the operation is blocked until the episode completes.

20 Claims, 15 Drawing Sheets

US 11,188,266 B2

WRITE ORDERING FOR PERSISTENT MEMORY

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices.

When performing an operation from a client device, such as a write operation, the node may commit multiple actions upon storage in order to execute the write operation. For example, executing the write operation may include writing the data to the storage, writing metadata to the storage, updating a checksum, modifying pointers, etc. Some of these actions may depend upon prior successful commitment of other actions. Thus, the actions cannot just be committed in any order. Otherwise, if a crash occurs during the middle of executing the write operation, then data corruption and other issues can result if some but not all actions were successfully committed to the storage. This is problematic if the node is committing the actions to persistent memory because the persistent memory does not provide any guarantee that actions will be committed and persisted to the persistent memory in a particular order.

DETAILED DESCRIPTION

Figure 1:
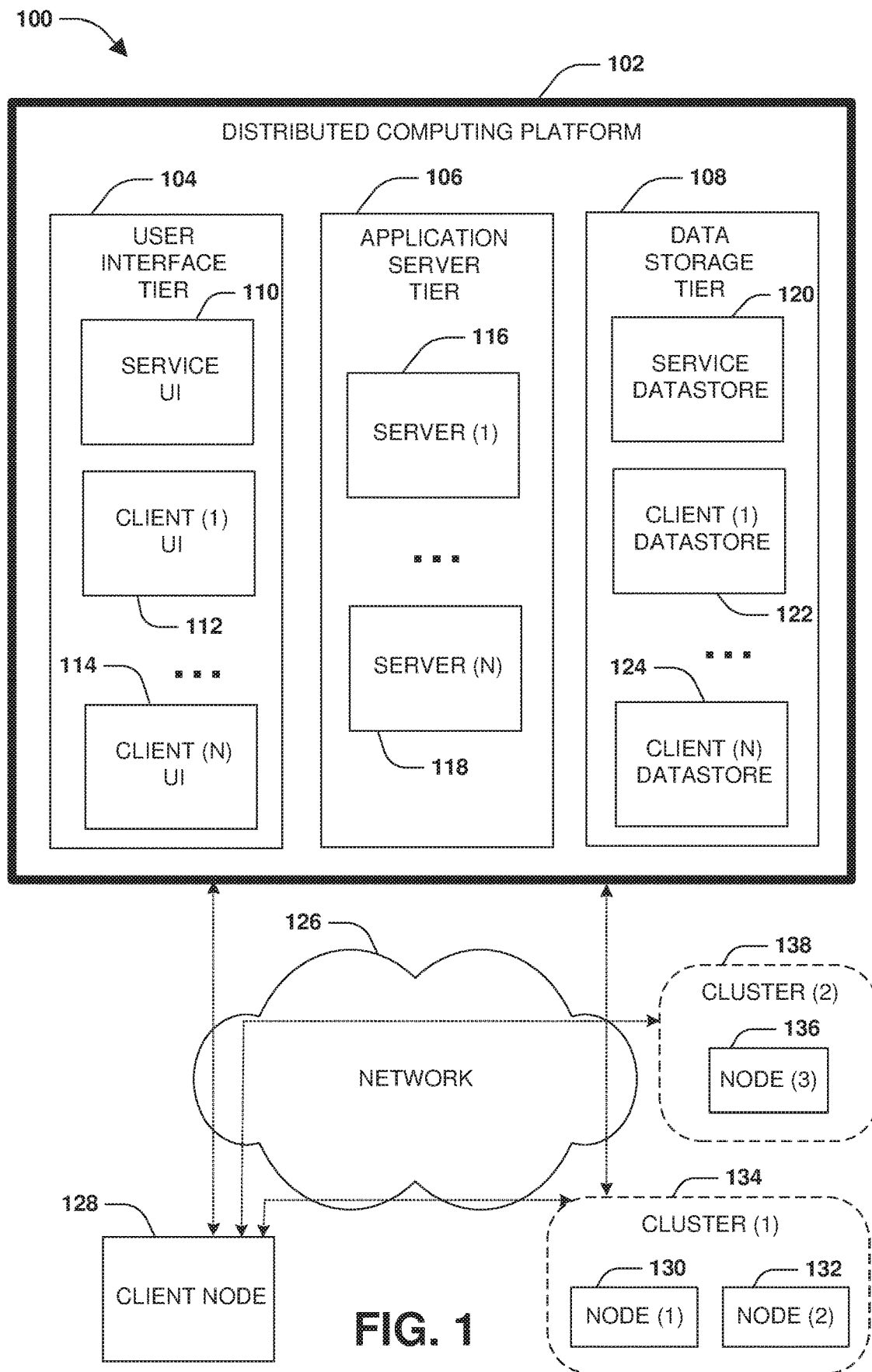
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A node may be implemented as a computing device, a server, an on-premise device, a virtual machine, hardware, software, or combination thereof. The node may be configured to manage storage on behalf of client devices using various types of storage, such as hard disk drives, solid state drives, cloud storage, memory, persistent memory, or other types of storage within which client data may be stored through volumes, aggregates, cloud storage objects, etc. The node may manage this storage utilizing a storage operating system and a file system for organizing and managing the client data. The file system may be tailored for a certain type of storage, such as having APIs, data structures, and functionality capable of accessing and storing data within byte-addressable storage such as persistent memory. In this way, a client device can connect to the node in order to access the client data through the file system, such as data stored in the persistent memory.

The node may utilize the persistent memory to improve performance and processing of client I/O because persistent memory provides relatively lower latency and faster access speeds compared to other storage, such as disk drives, solid state drives, and cloud storage. The persistent memory is byte-addressable and provides similar access characteristics and semantics as memory, such as dynamic random-access memory (DRAM). Unfortunately, the persistent memory does not guarantee the order of which actions, such as writes, of an operation will be committed, such as persisted to the persistent memory. For example, if a first write, a second write, and a third write of an operation (e.g., three writes that are performed to execute a single write operation, such as where the first write is to write the actual data, the second write is to write metadata, and the third write is to write to a checksum) are committed to the persistent memory by the file system, then the writes could be committed to the persistent memory in any order. If the node crashes, reboots, or another issue occurs before the writes are acknowledged by the persistent memory as being successfully committed, then all, some, or none of the actions of the operation may have been successfully committed, which can result in unfixable data corruption. For example, the first write and the third write may be successfully committed, but not the second write, and thus the data and the checksum are written to the persistent memory but not the metadata. In another example, only the third write may successfully complete, and thus only the checksum is updated. After the reboot, there may be no way to determine which writes were successfully committed to the persistent memory, and thus unfixable data corruption can result.

Accordingly, as provided herein, write ordering for persistent memory is implemented. In particular, an interface is provided for controlling write ordering for the persistent memory of a node, such as a storage controller, a server, an on-premise device, a virtual machine such as a storage virtual machine, hardware, software, or combination thereof. The interface may be implemented as hardware, software, a model, or a combination thereof. The interface is configured to create one or more episodes that are separately committed one at a time to the persistent memory. Actions of an operation that can be committed in any order are grouped into an episode. If two actions cannot be committed in any order with respect to one another, then those actions are grouped into separate episodes from one another. The interface is implemented to ensure that content of the persistent memory can be reconstructed into a consistent state in the event a crash or other failure occurs during the processing of any episode.

In an example, an operation may be received by the node from a client device, such as a write operation to write data to storage maintained by the node. The storage operating system of the node may determine that the write operation should be executed upon the persistent memory through the file system. In order to execute the write operation, multiple actions may be committed to the persistent memory (e.g., multiple write actions may be performed to persist data to the persistent memory). For example, executing the write operation may include writing the data to the persistent memory, writing metadata to the persistent memory, updating a checksum, modifying pointers, and/or committing other actions that persist data to the persistent memory. In this way, the interface may identify a set of actions to commit to the persistent memory of the node for executing the operation upon the persistent memory.

The interface may assign actions to any number of episodes, such as a single episode or a plurality of episodes. In an embodiment, a minimum number of episodes may be created to increase performance in situations where episodes are not only being committed to the persistent memory of the node, but are also being mirrored to a partner node for commitment to a partner persistent memory. That is, remote direct memory access (RDMA) transfers may be performed to mirror the episodes to the partner node. However, these RDMA transfers and commitment of the episodes by the partner node can take a substantial amount of time, which can be reduced by minimizing the number of episodes since execution of the operation may be blocked or transmission of a next episode to the partner node is blocked until a current episode is successfully completed. In an embodiment, the number of episodes may be a factor of how easily a consistent state of the persistent memory can be reconstructed after a crash of the node during execution of the operation. That is, the more episodes, the easier it will be to reconstruct the consistent state because individual episodes may each comprise less actions (e.g., actions are spread across more episodes) and reconstruction may be easier when less actions are being committed through a single episode in any order (an unknown order). An episode is comprised of actions that can be committed to the persistent memory in any order with respect to one another such that the consistent state of the persistent memory can be reconstructed in the event the node crashes during execution of the operation. The actions of an episode are not write order dependent upon one another, but may be write order dependent on other actions not included within the episode.

In an embodiment, a limited number of episodes (e.g., no more than one episode; less than a threshold number of episodes, etc.) can be in the process of being committed to the persistent memory at any given point in time. Thus, an episode cannot be committed to the persistent memory until a currently pending episode being committed to the persistent memory successfully completes. In a situation where the node is paired with the partner node, the episodes may be transmitted to the partner node for commitment to a partner persistent memory. In an embodiment, a limited number of episodes (e.g., no more than one episode; less than a threshold number of episodes, etc.) can be pending with the partner node for commitment to the partner persistent memory. Thus, an episode cannot be transmitted to the partner node for commitment to the partner persistent memory until a currently pending episode being committed to the partner persistent memory successfully completes. If the node fails, then the partner node can takeover for the failed node and service subsequent I/O from client devices by reconstructing the partner persistent memory into a consistent state using the up-to-date data within the partner persistent memory. In an embodiment, the partner node may reconstruct the partner persistent memory into a consistent state for servicing the subsequent I/O.

In this way, the interface such as model can create episodes that are committed to the persistent memory and/or the partner persistent memory in a manner that provides write ordering for the persistent memory. This allows for a consistent state of the persistent memory to be reconstructed in the event a crash or other failure occurs during execution of an operation.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
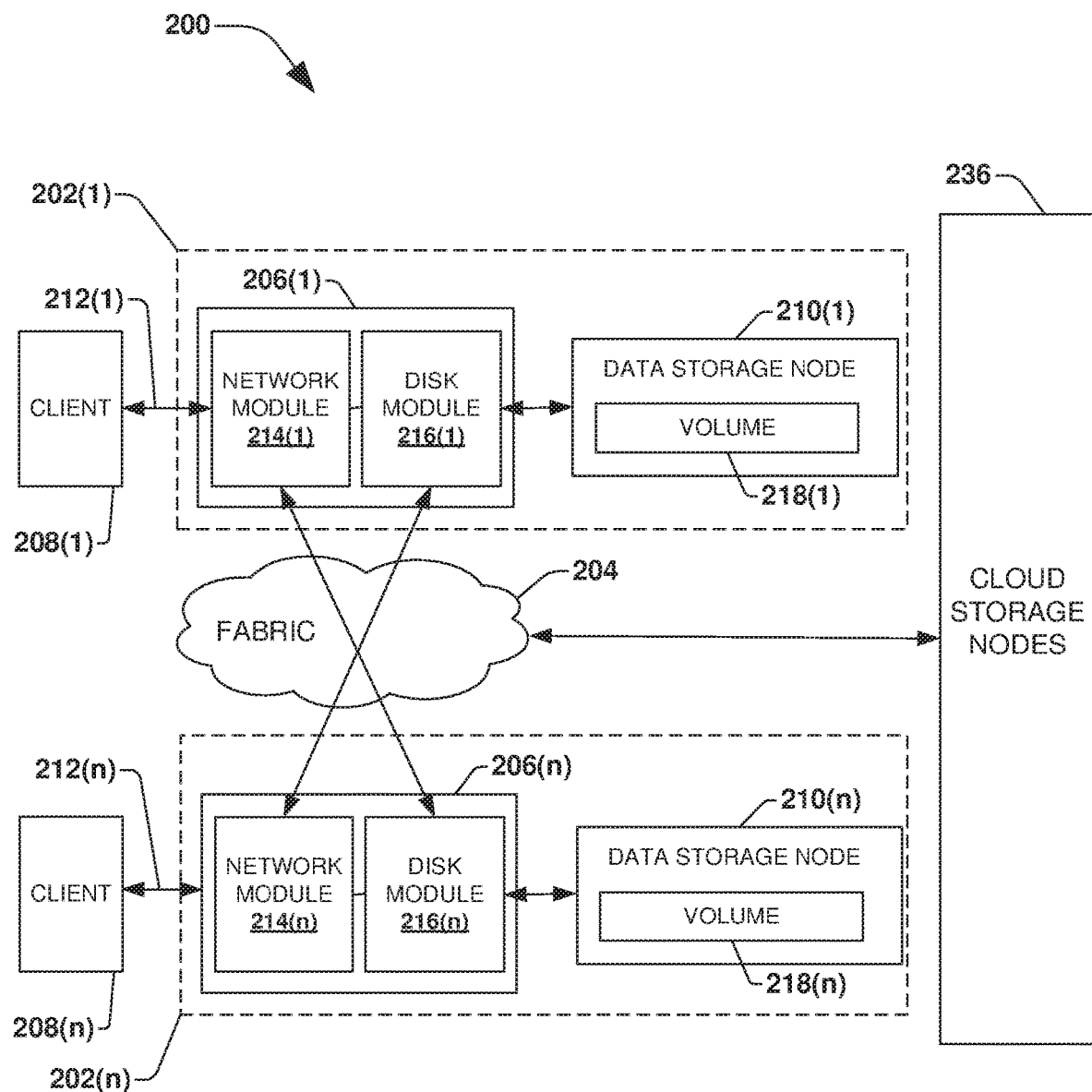
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
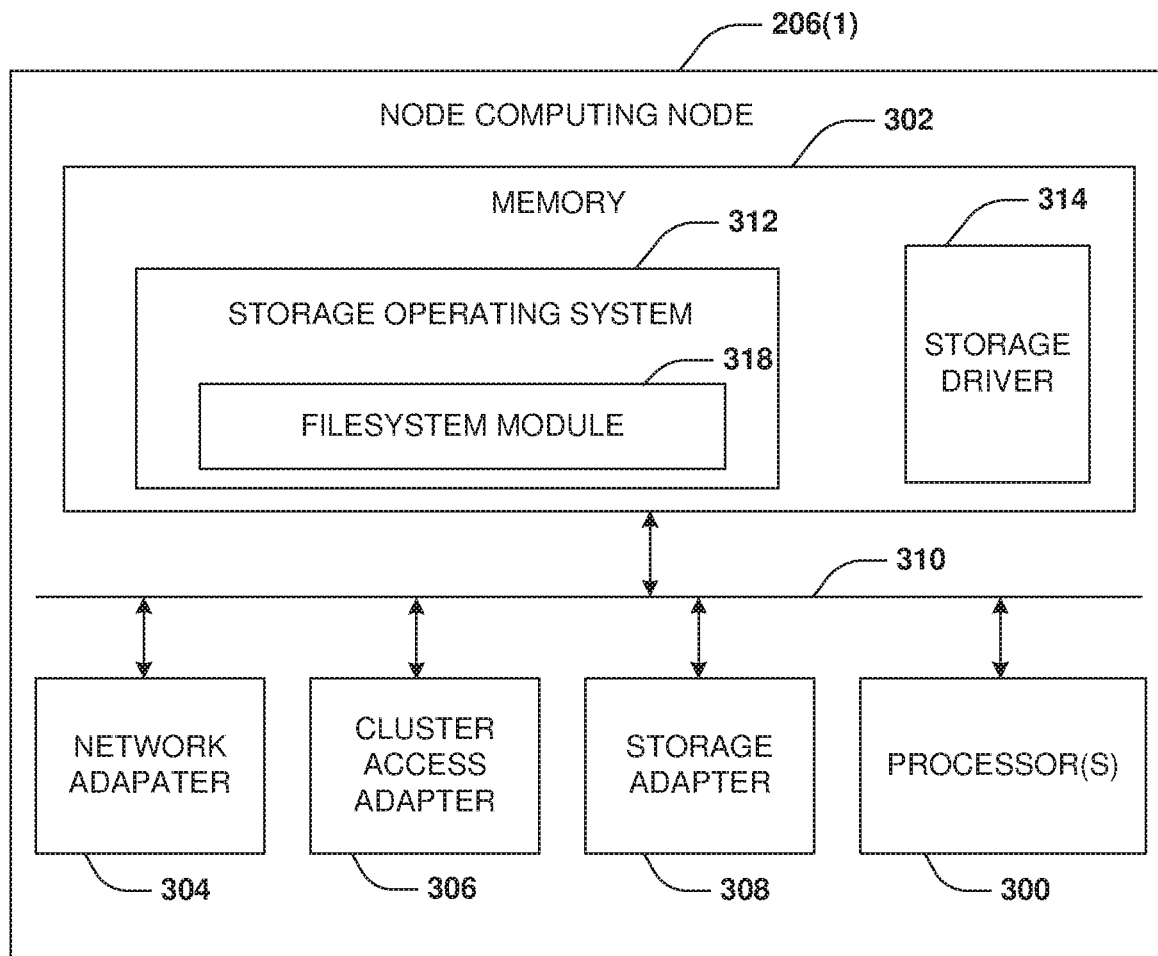
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example implementing write ordering for persistent memory as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
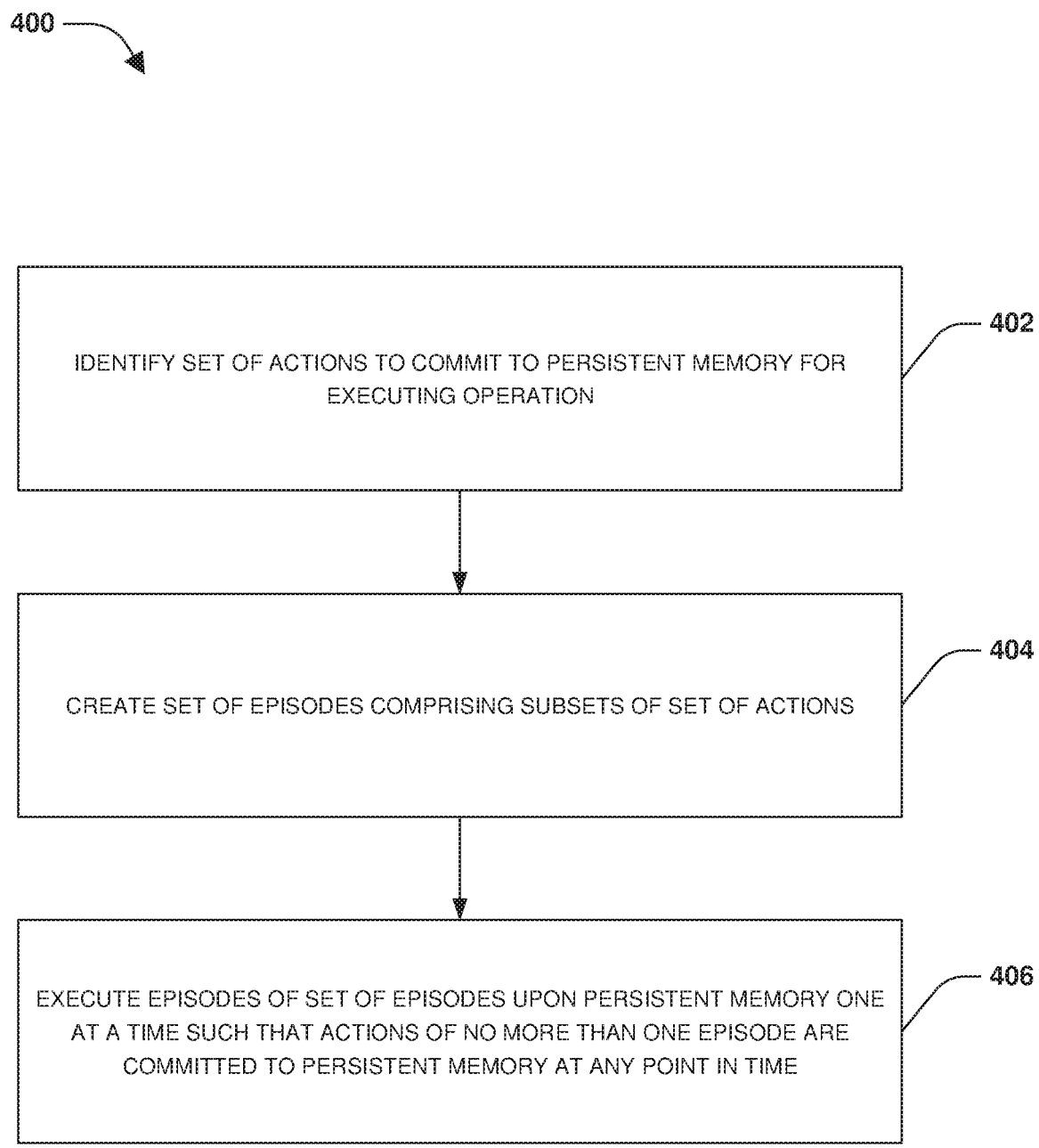
FIG. 4 is a flow chart illustrating an example method for implementing write ordering for persistent memory.

One embodiment of implementing write ordering for persistent memory is illustrated by an exemplary method 400 of FIG. 4, which is further described in conjunction with system 500 of FIGS. 5A-5J. A node 505 may comprise a server, an on-premise device, a virtual machine, computing resources of a cloud computing environment (e.g., a virtual machine hosted within the cloud), a computing device, hardware, software, or combination thereof. The node 505 may be configured to manage the storage and access of data on behalf of clients. The node 505 may host a storage operating system configured to store and manage data within and/or across various types of storage devices, such as locally attached storage, cloud storage, disk storage, flash storage, solid state drives, tape, hard disk drives, persistent memory, etc. The data may be stored within storage objects, such as volumes, logical unit numbers (LUNs), aggregates, cloud storage objects, etc. In an example, an aggregate or other storage object may be comprised of physical storage of a single storage device or storage of multiple storage devices or storage providers.

The storage operating system of the node 505 may implement a file system that manages the storage and client access of data within the storage objects stored within the storage associated with the node 505. For example, a client device may utilize the file system in order to create, delete, organize, modify, and/or access files within directories of a volume managed by the file system. In an example, the node 505 may utilize persistent memory 510 for storing client data. The persistent memory 510 may be byte-addressable and provide relatively lower latency and faster access speeds than other types of storage such as disk storage, cloud storage, etc. The file system may be configured with commands, APIs, data structures (e.g., data structures used to identify byte address locations of data the persistent memory 510), and/or other functionality (e.g., functionality to access certain byte ranges within the persistent memory 510) that is tailored to the byte-addressable access semantics of the persistent memory 510.

In an embodiment, the node 505 may be paired with a partner node 506. For example, the node 505 and the partner node 506 may be high availability (HA) partners. Data may be mirrored, replicated, and/or made accessible amongst the node 505 and the partner node 506, such that if one node fails then a surviving node can takeover for the failed node for servicing subsequent I/O in place of the failed node using up-to-date data mirrored from the failed node. For example, data being committing to a local partition within the persistent memory 510 of the node 505 may be replicated/mirrored to a remote partition within the partner persistent memory 508 of the partner node 506. Data being committed to a local partition within the partner persistent memory 508 of the partner node 506 may be replicated/mirrored to a remote partition within the persistent memory 510 of the node 505. In this way, the node 505 and the partner node 506 will have each other's up-to-date data within persistent memory in the event a node fails and a surviving node has to take over processing subsequent I/O in place of the failed node.

Figure 5A:
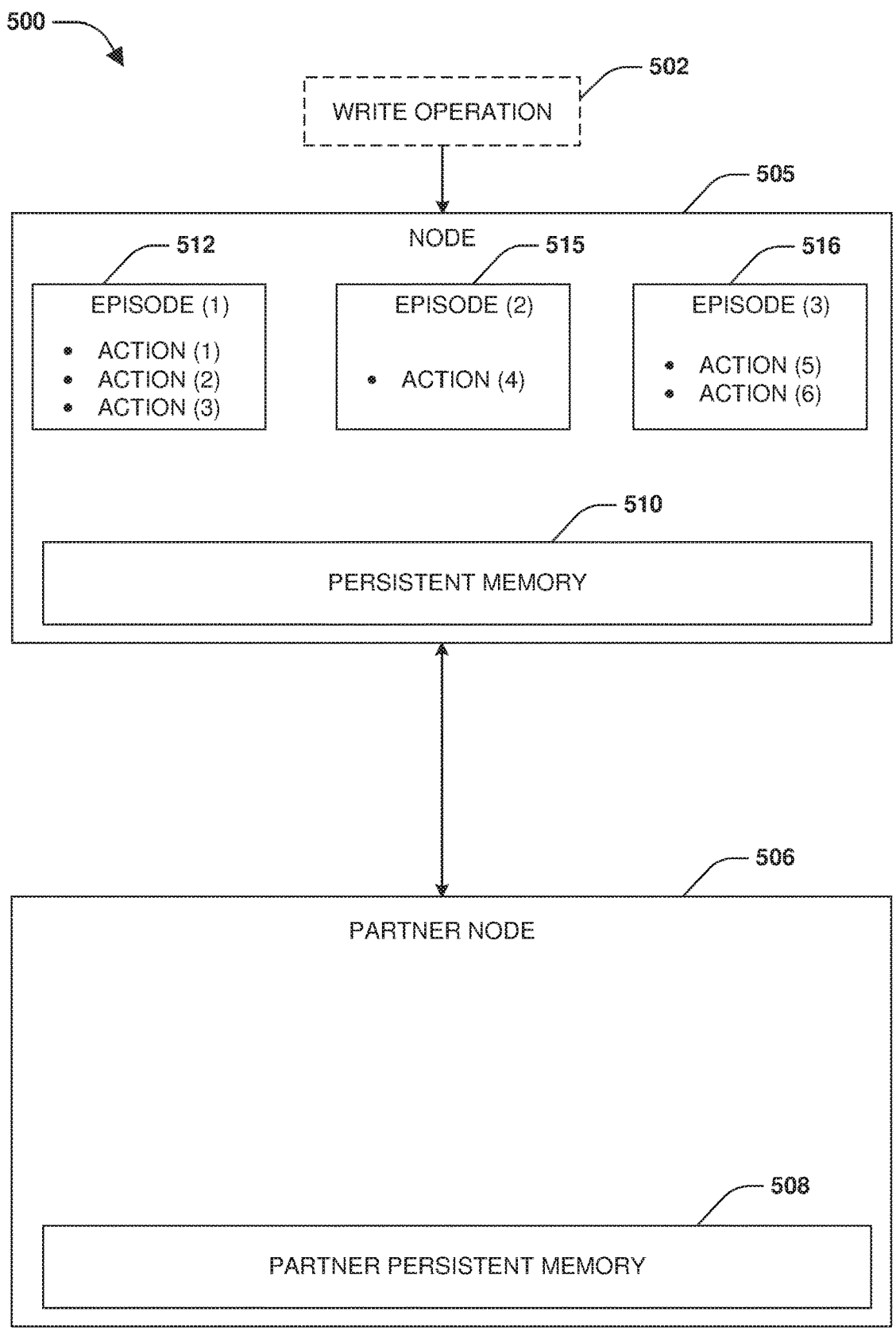
FIG. 5A is a block diagram illustrating an example system for implementing write ordering for persistent memory, where an operation is received by a node.

The node 505 may implement an interface through hardware and/or software such as a model (e.g., an algorithm) for controlling how operations are executed by the node 505 for storing data within the persistent memory 510, such as data of a write operation 502 received by the node 505 from a client device, as illustrated by FIG. 5A. Accordingly, at 402 (of FIG. 4's exemplary method 400), a set of actions to commit to the persistent memory 510 of the node 505 for executing the write operation 502 are identified. For example, the interface may determine that execution of the write operation 502 includes performing a first action, a second action, a third action, a fourth action, a fifth action, and a sixth action. The first action may pertain to writing the data of the write operation 502 into the persistent memory 510. The second action may pertain to writing metadata associated with the data into the persistent memory 510. The third action may pertain to updating pointers stored within the persistent memory 510. The fourth action may pertain to calculating and updating a checksum of the data, which should be performed after the data is written to the persistent memory 510. It may be appreciated that any number and types of actions may be identified for a particular operation, and the actions described herein are merely for illustrative purposes.

At 404, a set of episodes comprising subsets of the set of actions are created, such as by the interface. For example, a first episode 512 is created to include the first action, the second action, and the third action of the write operation 502, but not other actions of the write operation 502. The first action, the second action, and the third action are accumulated into the first episode 512, for example, because the interface may determine that the first action, the second action, and the third action can be committed to the persistent memory 510 in any order with respect to one another such that a consistent state of the persistent memory 510 can be reconstructed in the event of a crash of the node 505 during execution of the write operation 502. In an embodiment, the actions are accumulated into the first episode 512 until a stopping point is triggered, such as once the third action has been included within the first episode 512. The stopping point may correspond to reaching a point where if additional actions were further accumulated into the first episode 512, then the consistent state of the persistent memory 510 could not be reconstructed in the event of the crash of the node 505 during execution of the write operation 502.

The accumulation of one or more additional actions of the write operation 502, not accumulated into the first episode 512, into a next episode is trigged in response to the stopping point being reached for the first episode 512. For example, a second episode 515 is created to include the fourth action of the write operation 502, but not other actions of the write operation 502. The fourth action of the write operation 502 is accumulated into the second episode 515 because the fourth action must be committed to the persistent memory 510 by itself in order for the consistent state of the persistent memory 510 to be reconstructed in the event of a crash of the node 505 during execution of the write operation 502. In an embodiment, actions of the write operation 502 are accumulated into the second episode 515 until a stopping point is triggered. The stopping point may correspond to reaching a point where if additional actions were further accumulated into the second episode 515, then the consistent state of the persistent memory 510 could not be reconstructed in the event of the crash of the node 505 during execution of the write operation 502.

The accumulation of one or more additional actions of the write operation 502, not accumulated into the first episode 512 and the second episode 515, into a next episode is trigged in response to the stopping point being reached for the second episode 515. For example, the third episode 516 is created to include the fifth action and the sixth action of the write operation 502. The fifth action and the sixth action of the write operation 502 are accumulated into the third episode 516 because the fifth action and the sixth action can be committed to the persistent memory 510 in any order with respect to one another such that the consistent state of the persistent memory 510 can be reconstructed in the event of a crash of the node 505 during execution of the write operation 502.

In an embodiment, the episodes are determined and created ahead of time before any of the episodes are committed to persistent memory 510. In another embodiment, the episodes are determined and created in real-time as episodes are committed and/or completed, such as where the second episode 515 is created once the first episode 512 is committed to the persistent memory 510. In another embodiment, one or more episodes may be created while another episode is being committed to the persistent memory. In another embodiment, one or more episodes may be currently created.

In an embodiment, an action (e.g., a write action to write metadata into the persistent memory 510, a write action to update a checksum, a write action to write data of the write operation 502 to the persistent memory 510, etc.) is included within an episode as an atom. In an embodiment, the atom comprises an address of a location of data being written by the action to the persistent memory 510. In an embodiment, the atom comprises a length that is a number of bytes of the data beginning at the address. In an embodiment, an episode has <address, length> tuples as atoms describing the changed data from the actions within the episode (e.g., an address and length of data being written to the persistent memory 510). For example, a 4 byte atom may correspond to <0xffflabc0, 4> and a 4 kb atom may correspond to <0xffiffa000, 4096>.

In an embodiment, each episode is labeled so that particular actions are taken upon the completion of an episode. In an example, an episode that is to be committed to the persistent memory 510 last, such as the third episode 516, is labeled as a final episode. The other episodes, such as the first episode 512 and the second episode 515, are labeled as intermediate episodes. When an intermediate episode is being committed to the persistent memory 510, the write operation 502 is blocked/suspended until the intermediate episode completes. Once the intermediate episode completes, execution of the write operation 502 is resumed based upon the condition of an intermediate episode completing. When the final episode completes, then a notification is transmitted to a client device that originated the write operation 502. The notification may indicate that the write operation 502 has successfully been completed.

In an embodiment of creating the set of episodes, a minimum set of episodes is created for performance reasons. For example, when an episode is committed to the persistent memory 510, the episode is also transmitted to the partner node 506, such as through a remote direct memory access (RDMA) transaction, for commitment to the partner persistent memory 508 by the partner node 506. This can take a substantial amount of time during which further execution of the write operation 502 may be halted. The more episodes to transmit to the partner node 506, the greater the processing delay of the write operation 502. Another consideration when determining what number of episodes to create is the difficulty to reconstruct the persistent memory 510 into the consistent state if the node 505 crashes during execution of the write operation 502. Distributing the set of actions across more episodes will result in a small concentration of actions being included within each episode. Reducing the number of actions within an episode will reduce the number of actions that will be committed/persisted in any order, which will reduce the complexity of reconstructing the persistent memory 510 into the consistent state if the node 505 crashes during execution of the write operation 502. A particular number of episodes to create may be determined based upon one or more thresholds, such as a minimum threshold number of episodes and/or a maximum threshold number of episodes.

Figure 5B:
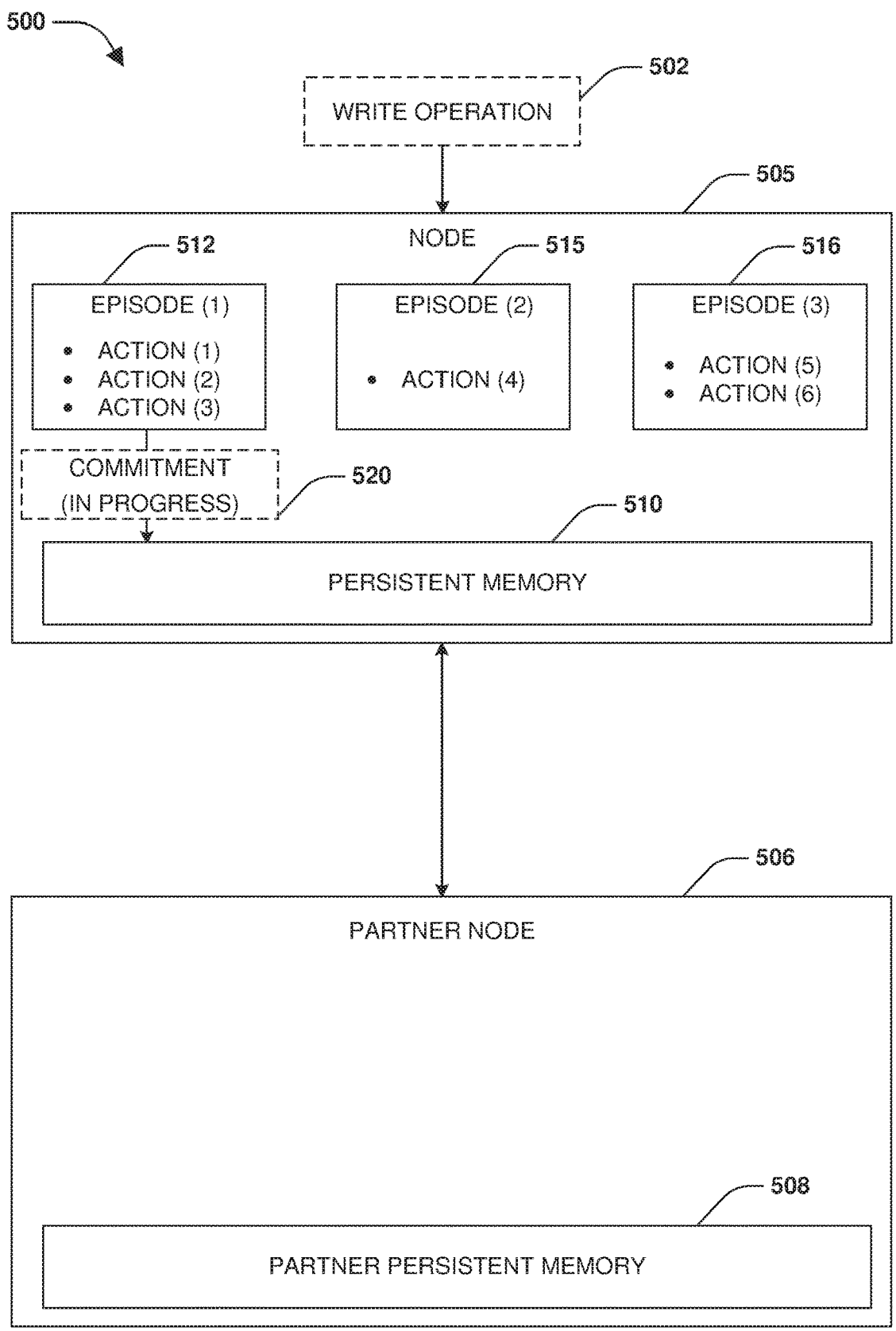
FIG. 5B is a block diagram illustrating an example system for implementing write ordering for persistent memory, where a first episode is committed to the persistent memory.

At 406, the episodes are executed upon the persistent memory 510 one at a time such that actions of no more than one episode are committed to the persistent memory 510 at any point in time. For example, commitment 520 of the first episode 512 to the persistent memory 510 is performed first, as illustrated by FIG. 5B. That is, the first action, the second action, and the third action of the first episode 512 are transmitted to the persistent memory 510 for commitment, such as to persist information being written by the first action, the second action, and the third action of the write operation 502 to the persistent memory 510. The order of the first action, the second action, and the third action of the write operation 502 being committed to the persistent memory 510 does not matter, and is not guaranteed by the persistent memory 510. However, a consistent state of the persistent memory 510 can be reconstructed even if the node 505 crashes during the commitment 520 of the first episode 512 because the actions within the first episode 512 can be committed in any order, and thus the consistent state of the persistent memory 510 can be easily recreated after the node 505 recovers from the crash. While the first episode 512 is being committed 520 to the persistent memory 510, no other episodes can be committed to the persistent memory 510, and thus processing of the write operation 502 may be blocked until the persistent memory 510 indicates that the commitment 520 of the first episode 512 has successfully been completed to the persistent memory 510. In this way, a rule is enforced for executing the write operation 502 such that the node 505 is restricted from executing more than a single episode at a time upon the persistent memory 510.

Figure 5C:
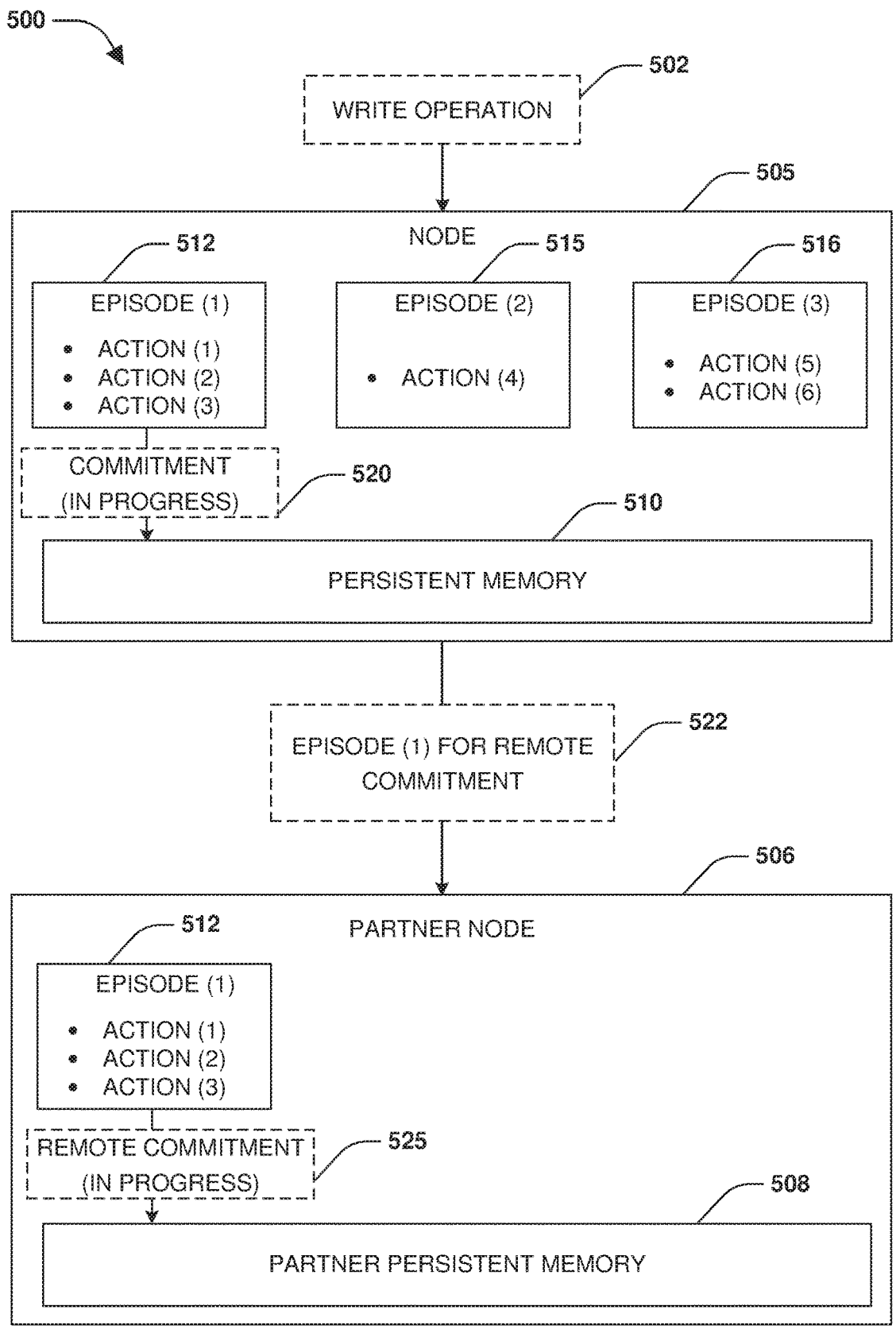
FIG. 5C is a block diagram illustrating an example system for implementing write ordering for persistent memory, where a first episode is transmitted to a partner node for commitment to a partner persistent memory.

The first episode 512 may be transmitted 522 from the node 505 to the partner node 506 for remote commitment 525 of the first episode 512 to the partner persistent memory 508 of the partner node 506, as illustrated by FIG. 5C. For example, the first episode 512 may be transmitted 522 (e.g., at any time, such as substantially at the same time) to the partner node 506 while the first episode 512 is completing commitment 520 at the first node 505. In an embodiment, the first episode 512 is transmitted 522 as a remote direct memory access (RDMA) transaction from the node 505 to the partner node 506. In this way, the partner node 506 will commit the first action, the second action, and the third action of the write operation 502 to the partner persistent memory 508. While the first episode 512 is being committed 525 to the partner persistent memory 508, no other episodes can be transmitted to the partner node 506 by the node 505 until the partner node 506 provides an indication that the first episode 512 has successfully been committed 532 to the partner persistent memory 508. In this way, a rule is enforced for executing the write operation 502 such that the node 505 is restricted from transmitting a next episode, such as the second episode 515, to the partner node 506 for commitment to the partner persistent memory 508 until a pending episode, such as the first episode 512, has been acknowledged by the partner node 506 as completing, such that only a single episode is being committed by the partner node 506 to the partner persistent memory 508 at any given point in time.

In an embodiment, further execution of the write operation 502 is blocked until a notification is received from the partner node 506 that the first episode 512 completed at the partner node 506. However, blocking the write operation 502 from further executing until the first episode 512 completes at the partner node 506 may introduce significant delay in completing the write operation 502 because the transmission 522 of the first episode 512 from the node 505 to the partner node 506 (e.g., an RDMA transaction), the commitment of the first episode 512 to the partner persistent memory 508 by the partner node 506, and the transmission of the notification of success from the partner node 506 to the node 505 can take a substantial amount of time. Accordingly, in an embodiment, the node 505 may continue executing the write operation 502 to commit a next episode (e.g., the second episode 515) upon the persistent memory 510 while the first episode 512 is being remotely committed 525 by the partner node 506 upon the partner persistent memory 508 so long as the first episode 512 has completed at the node 505, which will be further described in relation to FIGS. 5D and 5E.

Figure 5D:
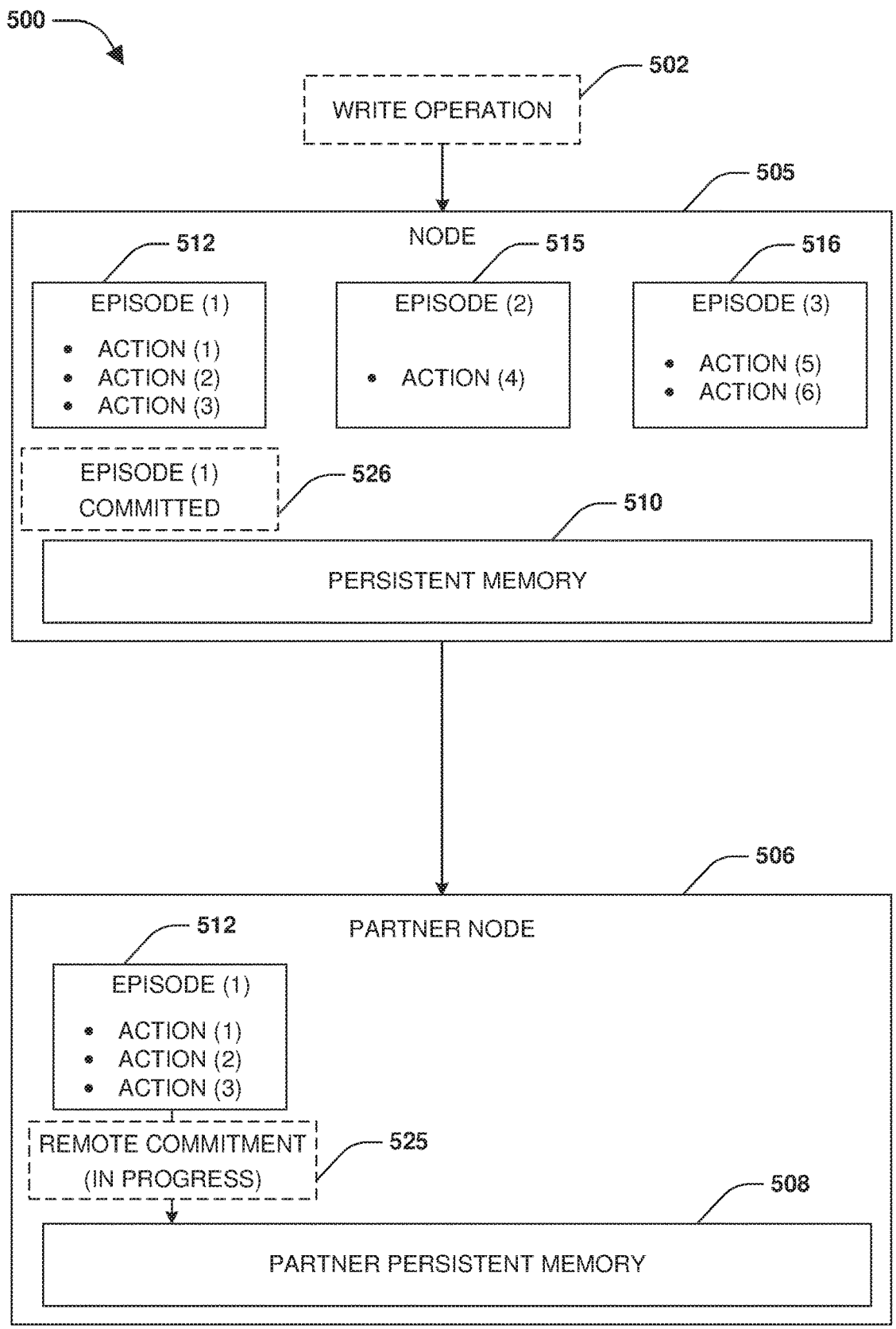
FIG. 5D is a block diagram illustrating an example system for implementing write ordering for persistent memory, where a first episode is successfully committed to the persistent memory of a node.

FIG. 5D illustrates the first episode 512 successfully 526 being committed to the persistent memory 510. In particular, the first action, the second action, and the third action of the write operation 502 have been successfully 526 committed to the persistent memory 510 in some sort of order because there is no guarantee of the order with which data of the first action, the second action, and the third action of the write operation 502 will be persisted to the persistent memory 510. However, the first action, the second action, and the third action of the write operation 502 can be committed in any order while still maintaining the ability to reconstruct a consistent state of data within the persistent memory 510 upon recovering from a crash that occurs during execution of the write operation 502, and thus the reason the first action, the second action, and the third action were included within the same first episode 512.

Figure 5E:
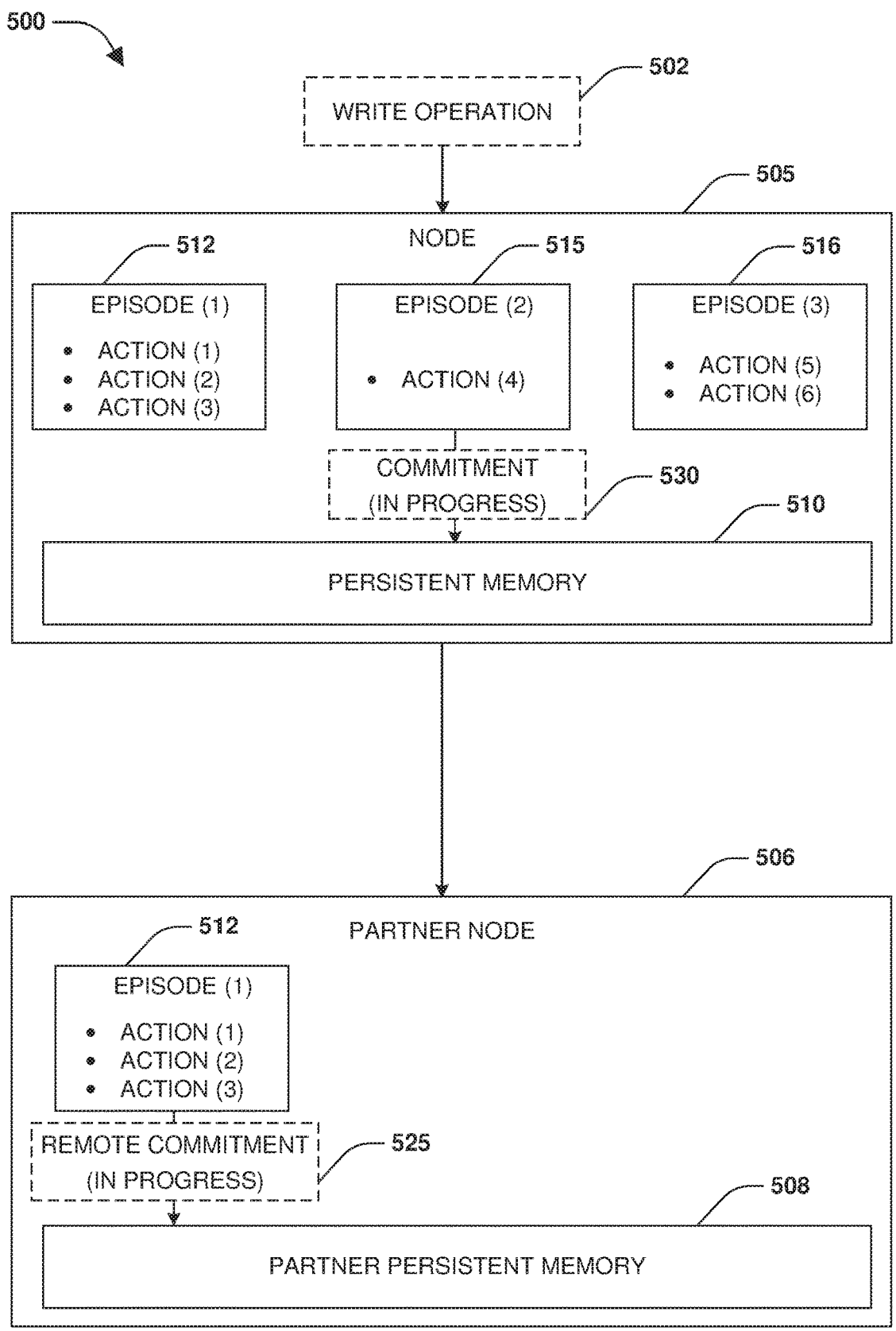
FIG. 5E is a block diagram illustrating an example system for implementing write ordering for persistent memory, where a second episode is committed to the persistent memory.

In response to the first episode 512 successfully 526 being committed to the persistent memory 510 by the node 505, resumption of the write operation 502 is triggered. Accordingly, the second episode 515 is committed 530 to the persistent memory 510, as illustrated by FIG. 5E. In an embodiment, the commitment 530 of the second episode 515 to the persistent memory 510 is triggered notwithstanding the fact that the node 505 has not yet received a notification from the partner node 506 that the commitment 525 of the first episode 512 has successfully been completed to the partner persistent memory 508 by the partner node 506. In this way, the fourth action of the second episode 515 is committed 530 to the persistent memory 510 in order to persist data of the fourth action of the write operation 502 into the persistent memory 510.

Figure 5F:
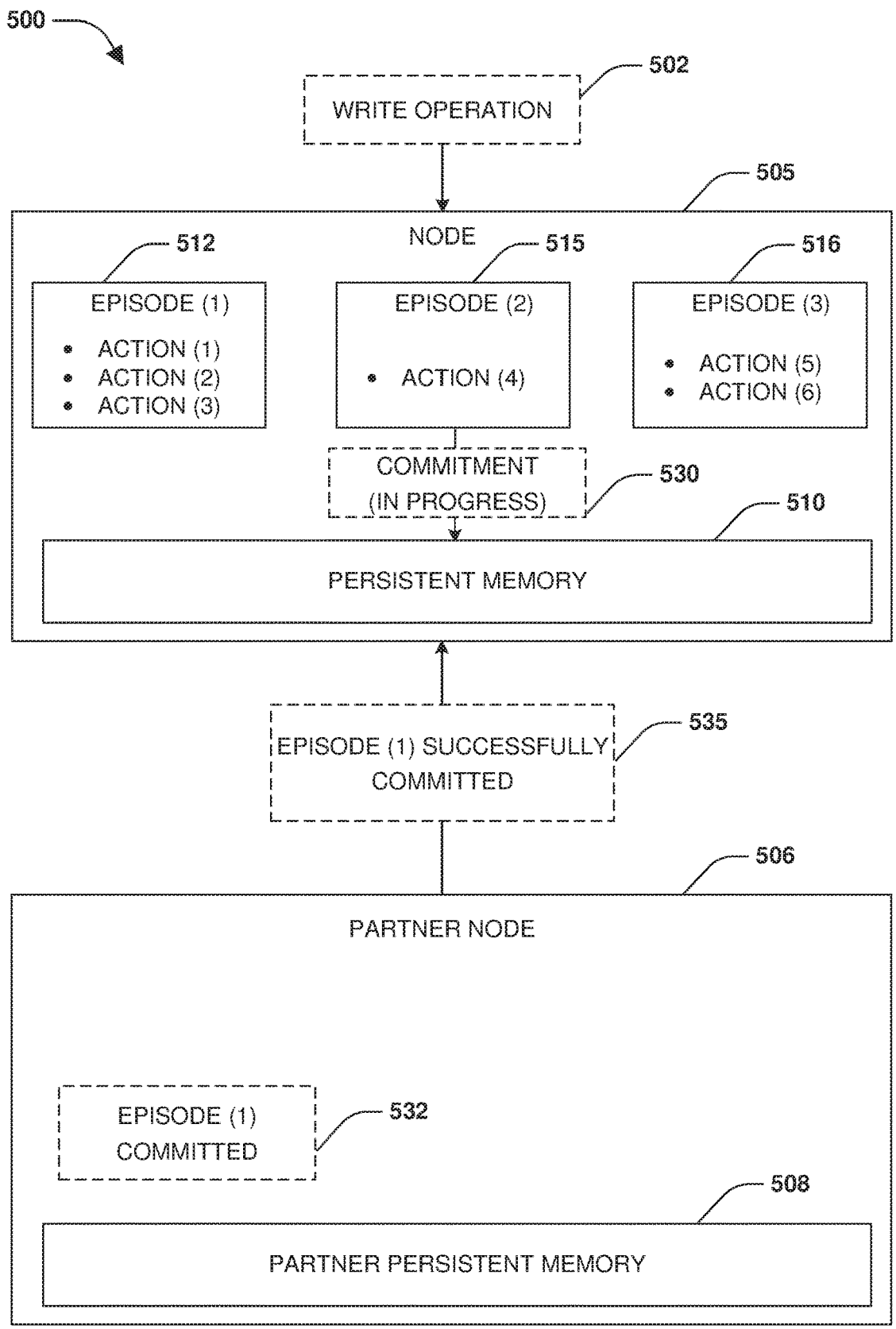
FIG. 5F is a block diagram illustrating an example system for implementing write ordering for persistent memory, where a first episode is successfully committed to a partner persistent memory.
Figure 5G:
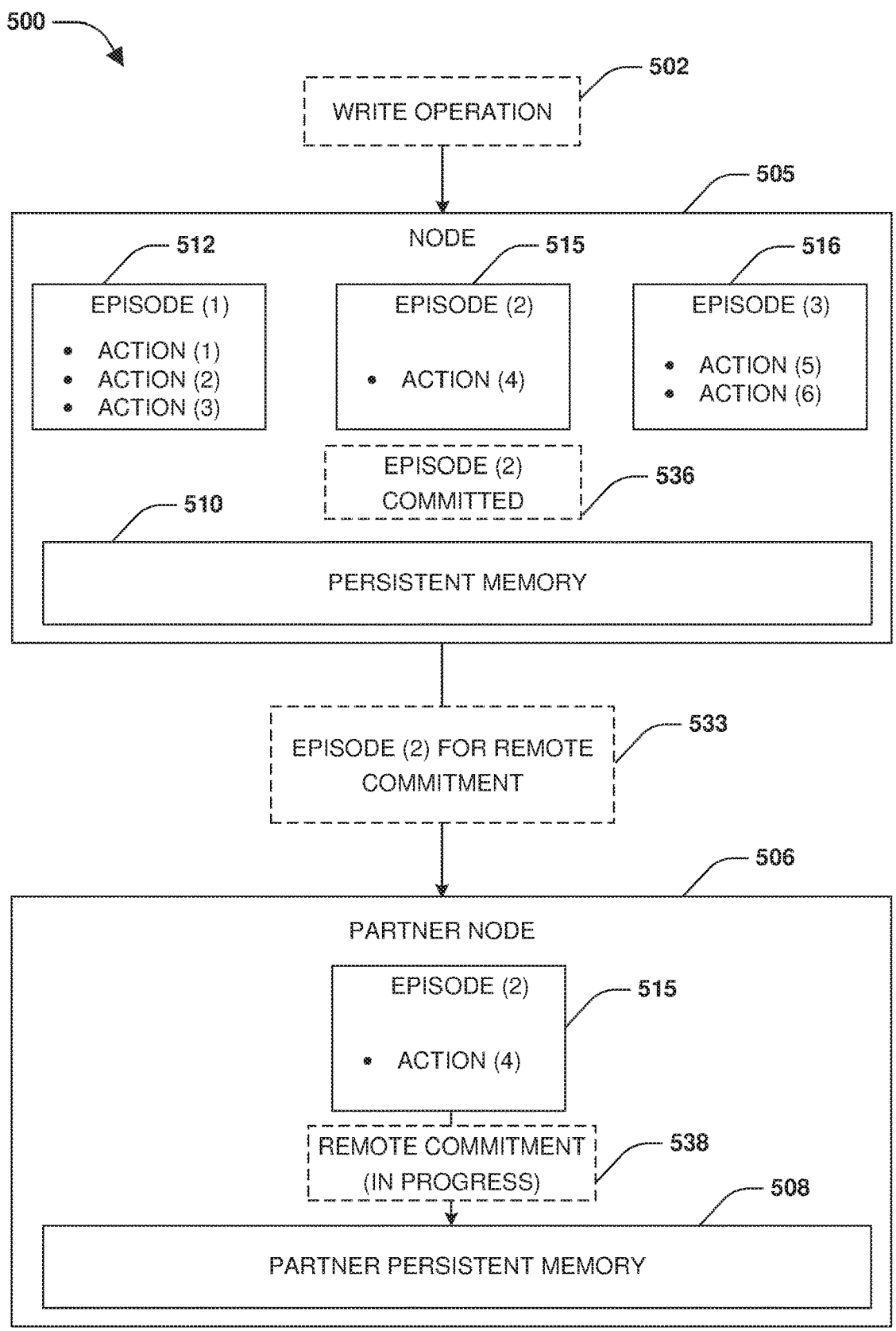
FIG. 5G is a block diagram illustrating an example system for implementing write ordering for persistent memory, where a second episode is successfully committed to the persistent memory.

The node 505 may receive a notification 535 from the partner node 506 that the first episode 512 was successfully 532 committed to the partner persistent memory 508, as illustrated by FIG. 5F. In response to receiving the notification 535 that the first episode 512 was successfully 532 committed to the partner persistent memory 508, the node 505 is triggered to transmit 533 the second episode 515 to the partner node 506, as illustrated by FIG. 5G. For example, the second episode 515 may be transmitted 533 while the second episode 515 is completing commitment 530 at the first node 505. In an embodiment, the node 505 transmits 533 the second episode 515 to the partner node 506 using an RDMA transmission. The second episode 515 is transmitted 533 to the partner node 506 to commit 538 the second episode 515 to the partner persistent memory 508. In this way, the partner node 506 will commit 538 the fourth action of the second episode 515 to the partner persistent memory 508 by persisting data of the fourth action of the write operation 502 to the partner persistent memory 508. While the partner node 506 is committing 538 the second episode 515 to the partner persistent memory 508, the node 505 is blocked from transmitting other episodes, such as the third episode 516 to the partner node 506.

Figure 5H:
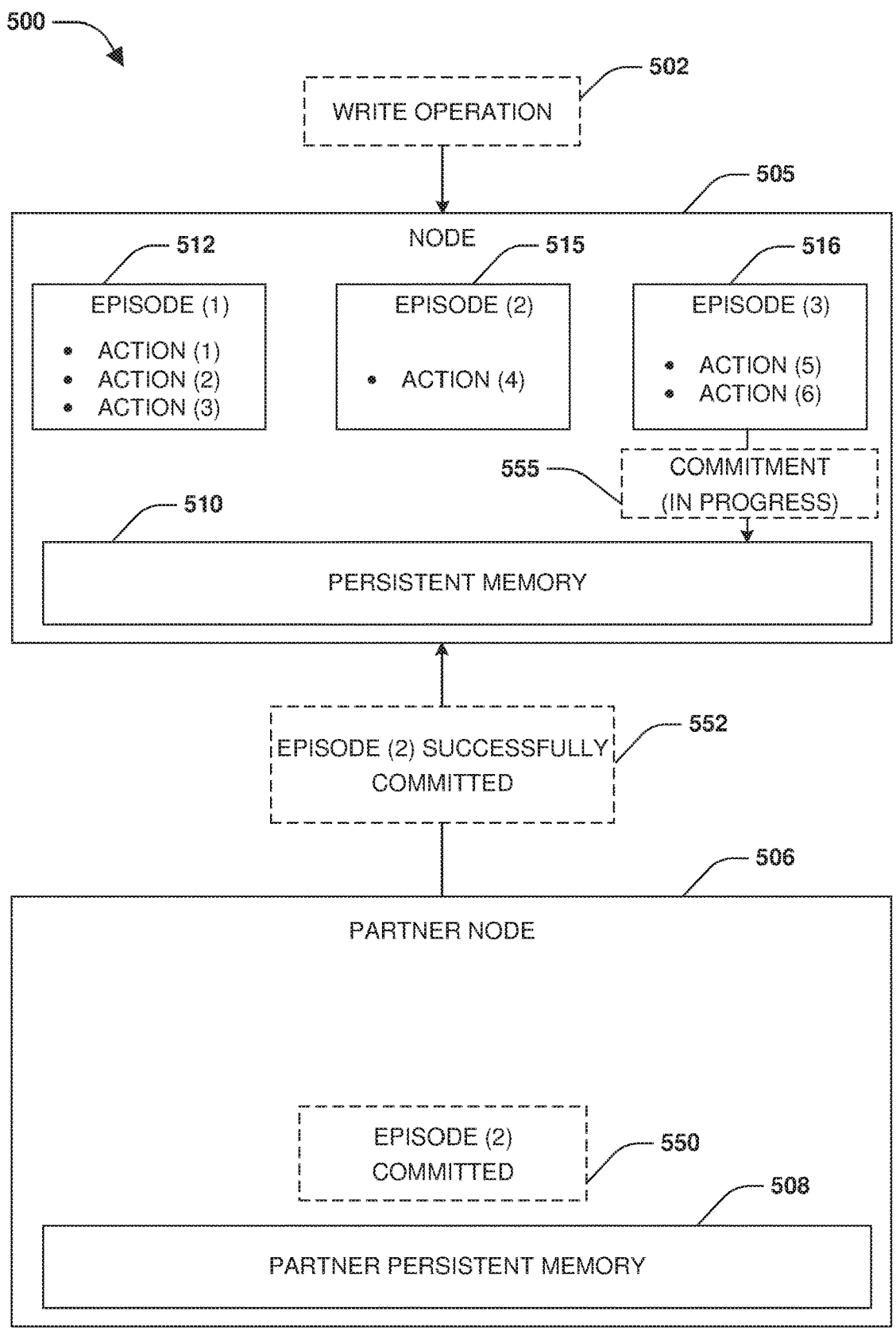
FIG. 5H is a block diagram illustrating an example system for implementing write ordering for persistent memory, where a third episode is committed to the persistent memory.

The second episode 515 may successfully 536 be committed to the persistent memory 510 by the node 505, as illustrated by FIG. 5G. Accordingly, the node 505 may be triggered to commit 555 the third episode 516 to the persistent memory 510 in response to the second episode 515 being successfully 536 committed to the persistent memory 510 by the node 505, as illustrated by FIG. 5H. The third episode 516 is committed 555 to the persistent memory 510 in order to commit the fifth action and the sixth action of the write operation 502 to the persistent memory 510 by persisting data of the fifth action and the sixth action of the write operation 502 to the persistent memory 510. Even though the persistent memory 510 may persist the data of the fifth action and the sixth action in any order, a consistent state of data within the persistent memory 510 can be reconstructed in the event the node 505 crashes during execution of the write operation 502.

The first episode 512 and the second episode 515 are intermediate episodes. Completion of the first episode 512 and the second episode 515 triggers execution of the write operation 502 to continue. The third episode 516 is a final episode. Completion of the third episode 516 (e.g., local commitment to the persistent memory 510 and remote commitment to the partner persistent memory 508) triggers the transmission of a response 566 to the client device that originated the write operation 502 that the write operation 502 was successfully completed, which will be further described in relation to FIG. 5J.

Figure 5I:
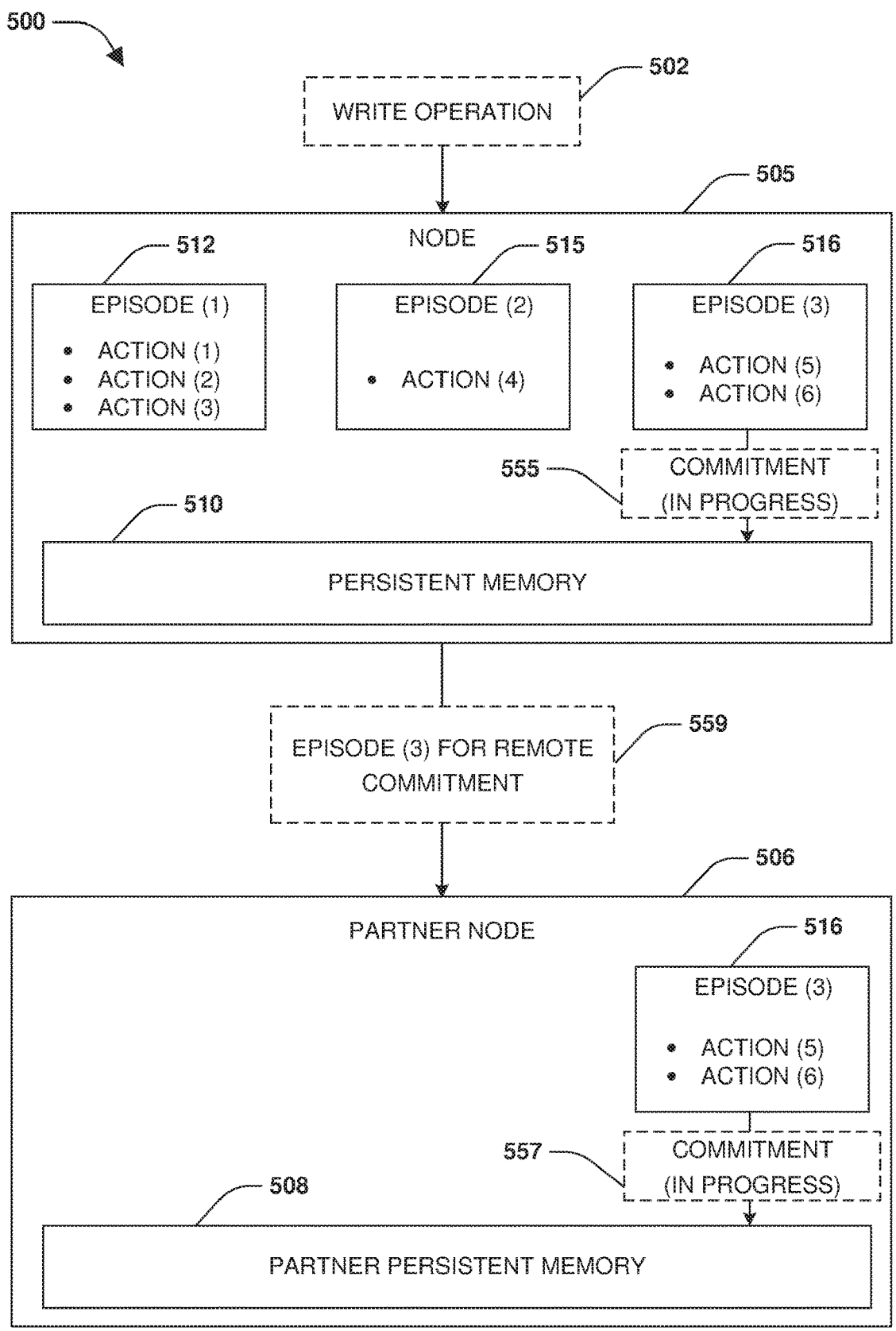
FIG. 5I is a block diagram illustrating an example system for implementing write ordering for persistent memory, where a third episode is committed to a partner persistent memory.

The node 505 may receive a notification 552 from the partner node 506 that the second episode 515 was successfully 550 committed to the partner persistent memory 508, as illustrated by FIG. 5H. In response to receiving the notification 552 that the second episode 515 was successfully 550 committed to the partner persistent memory 508, the node 505 is triggered to transmit 559 the third episode 516 to the partner node 506, as illustrated by FIG. 5I. For example, the third episode 516 may be transmitted 559 while the third episode 516 is completing commitment 555 at the first node 505. In an embodiment, the node 505 transmits 559 the third episode 516 to the partner node 506 using an RDMA transmission. The third episode 516 is transmitted 559 to the partner node 506 to commit 557 the third episode 516 to the partner persistent memory 508. In this way, the partner node 506 will commit the fifth action and the sixth action of the third episode 516 to the partner persistent memory 508 by persisting data of the fifth action and the sixth action of the write operation 502 of the partner persistent memory 508.

Figure 5J:
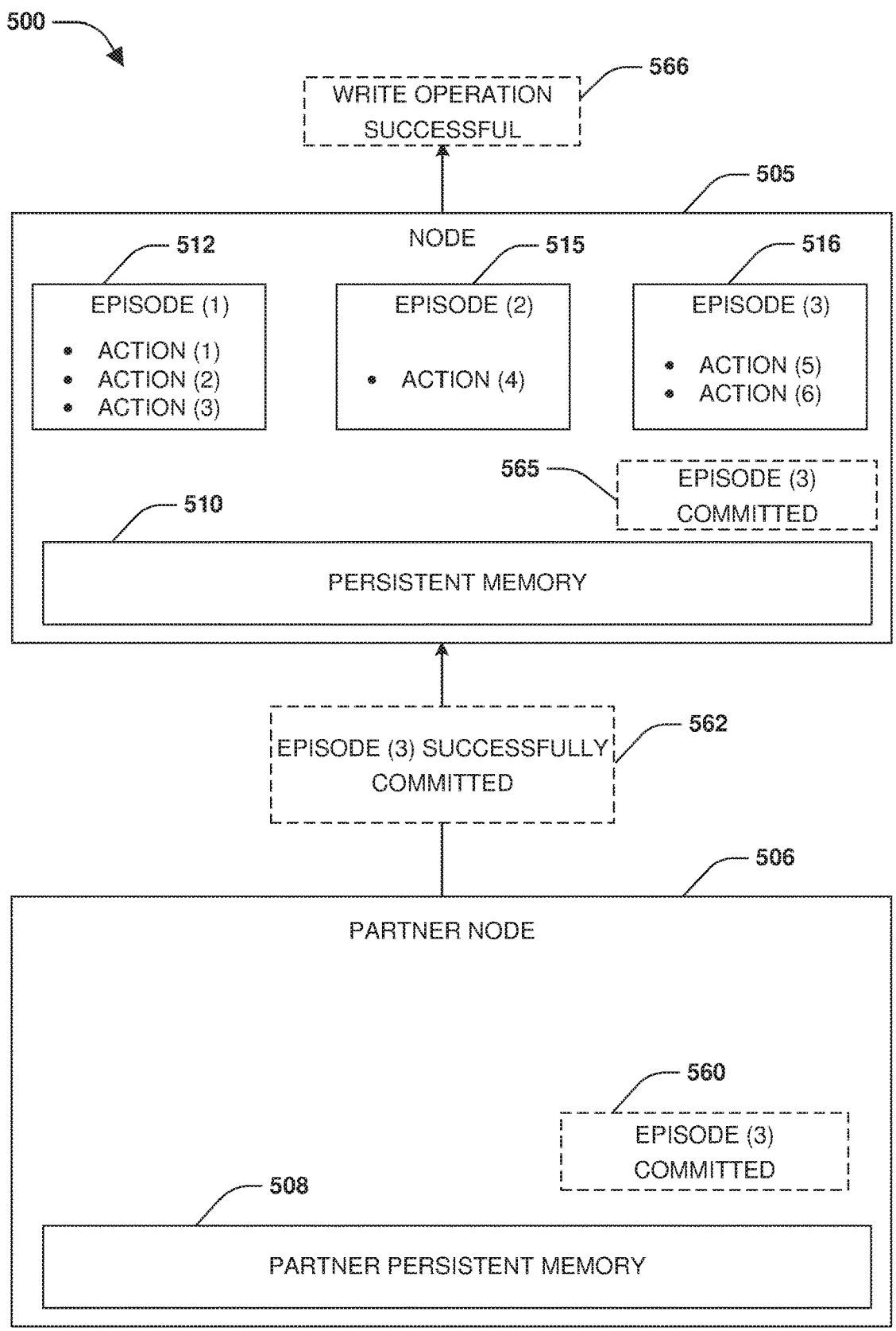
FIG. 5J is a block diagram illustrating an example system for implementing write ordering for persistent memory, where a success notification is returned for an operation.

The node 505 may receive a notification 562 from the partner node 506 that the third episode 516 was successfully 560 committed to the partner persistent memory 508, as illustrated by FIG. 5J. The node 505 may determine that the third episode 516 was successfully 565 committed to the persistent memory 510. In this way, all actions of the write operation 566 have successfully been committed to the persistent memory 510 of the node 505 and the partner persistent memory 508 of the partner node 506. Accordingly, the node 505 transmits the response 566 to the client device that originated the write operation 502 that the write operation 502 was successfully completed.

In an embodiment, a crash (failure) of the node 505 and/or the partner node 506 can occur during execution of the write operation 502. The crash could occur during commitment of the first episode 512, during commitment of the second episode 515, or during commitment of the third episode 516 by either the node 505 upon the persistent memory 510 or the partner node 506 upon the partner persistent memory 508. Because actions are grouped into separate episodes in a manner where actions within a single episode can commit/persist to the persistent memory 510 and the partner persistent memory 508 in any order and only a single episode can be in the process of being committed to the persistent memory 510 and to the partner persistent memory 508 at any given point in time, a consistent state of the persistent memory 510 and the partner persistent memory 508 can be reconstructed. In an embodiment, a consistent state of the persistent memory 510 can be reconstructed by the node 505 after recovering from the crash because the actions within an episode can be executed in any order. In another embodiment, a consistent state of the partner persistent memory 508 can be reconstructed by the partner node 506 in the event the node 505 fails and is failed over to the partner node 506 for processing subsequent I/O from client devices in place of the failed node 505 using the partner persistent memory 508.

In an embodiment, a log may be maintained to track data that can be used to reconstruct the persistent memory in the event of a failure of the node 505. The log may be used to track old data being overwritten by new data by an action or the log may be used to track the new data that is to overwrite the old data.

According to aspects of the present disclosure, an apparatus/machine/system for write ordering for persistent memory; a means for identifying a set of actions to commit to persistent memory of a node for executing an operation upon the persistent memory; a means for creating a first episode to comprise a first subset of actions of the set of actions that can be committed to the persistent memory in any order with respect to one another such that a consistent state of the persistent memory can be reconstructed in the event of a crash of the node during execution of the operation; a means for creating a second episode to comprise a second subset of actions of the set of actions that can be committed to the persistent memory in any order with respect to one another such that the consistent state of the persistent memory can be reconstructed in the event of the crash of the node during execution of the operation; a means for committing the first subset of actions within the first episode to the persistent memory and blocking further execution of the operation until the first episode completes; and a means for in response to the first episode completing, triggering resumption of the operation and committing the second subset of actions within the second episode to the persistent memory.

Figure 6:
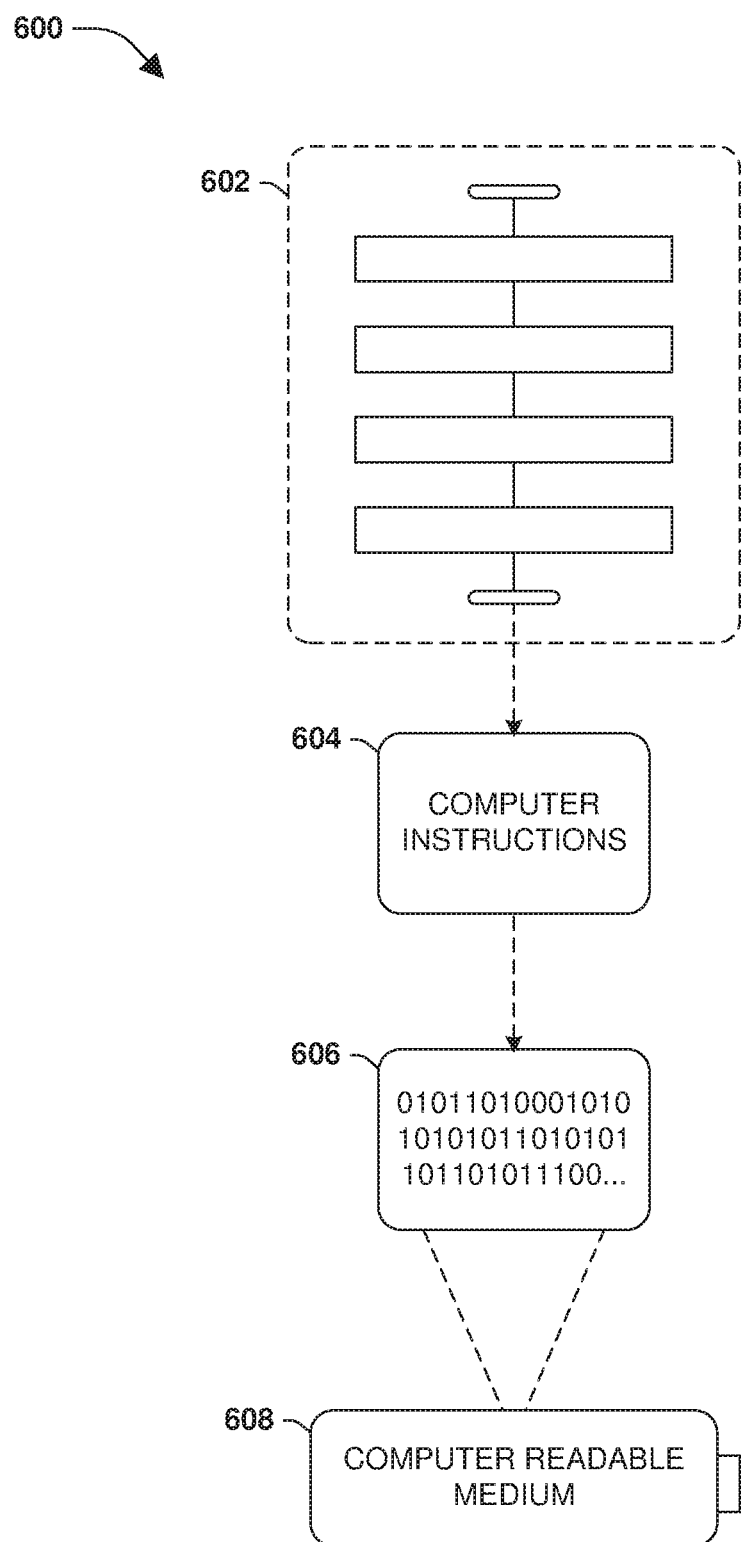
FIG. 6 is an example of a computer readable medium in which an embodiment of the invention may be implemented.

Still another embodiment involves a computer-readable medium 600 comprising processor-executable instructions configured to implement one or more of the techniques presented herein. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform a method 602, such as at least some of the exemplary method 400 of FIG. 4, for example. In some embodiments, the processor-executable computer instructions 604 are configured to implement a system, such as at least some of the exemplary system 500 of FIGS. 5A-5J, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   identifying a set of actions to commit to persistent memory of a node for executing an operation upon the persistent memory;
   creating a first episode to comprise a first subset of actions of the set of actions that can be committed to the persistent memory in any order with respect to one another;
   creating a second episode to comprise a second subset of actions of the set of actions that can be committed to the persistent memory in any order with respect to one another;
   committing the first subset of actions within the first episode to the persistent memory and blocking further execution of the operation until the first episode completes; and
   in response to the first episode completing, triggering resumption of the operation and committing the second subset of actions within the second episode to the persistent memory.

2. The method of claim 1, comprising:
   transmitting the first episode to a partner node for commitment of the first subset of actions to a partner persistent memory of the partner node.

3. The method of claim 2, wherein operations targeting the node are redirected to the partner node for execution utilizing data within the partner persistent memory based upon the node failing, wherein a partition, of the partner persistent memory into which data of the persistent memory of the node is mirrored, is reconstructed into the consistent state.

4. The method of claim 2, wherein the blocking comprises:
   blocking the further execution of the operation until a notification is received from the partner node that the first episode completed at the partner node.

5. The method of claim 2, comprising:
   in response to receiving a notification from the partner node that the first episode completed at the partner node, triggering transmission of the second episode to the partner node for commitment of the second subset of actions to the partner persistent memory.

6. The method of claim 2, comprising:
committing the second subset of actions within the second episode to the persistent memory before receiving a notification from the partner node that the first episode completed at the partner node.

7. The method of claim 2, comprising:
enforcing a rule for executing the operation, wherein the rule restricts the node from transmitting a next episode to the partner node for commitment to the partner persistent memory until a pending episode has been acknowledged by the partner node as completing.

8. The method of claim 1, wherein the first episode is created to comprise the first subset of actions of the set of actions that can be committed to the persistent memory in any order with respect to one another such that the consistent state of the persistent memory can be reconstructed in the event of the crash of the node during execution of the operation.

9. The method of claim 1, comprising:
enforcing a rule for executing the operation, wherein the rule restricts the node from executing more than a single episode at a time upon the persistent memory.

10. A non-transitory machine readable medium comprising instructions for performing a method, which when executed by a machine, causes the machine to:
identify a set of actions to commit to persistent memory of a node for executing an operation upon the persistent memory;
create a set of episodes comprising subsets of the set of actions, wherein an episode comprises a subset of the actions that can be committed to the persistent memory in any order with respect to one another such that a consistent state of the persistent memory can be reconstructed in the event of a crash of the node during execution of the operation; and
execute episodes of the set of episodes upon the persistent memory one at a time such that actions of no more than one episode are committed to the persistent memory at any point in time.

11. The non-transitory machine readable medium of claim 10, wherein an episode of the set of episodes that is to be committed to the persistent memory last is a final episode and other episodes within the set of episodes are intermediate episodes.

12. The non-transitory machine readable medium of claim 11, wherein further execution of the operation is blocked while actions of an intermediate episode are being committed to the persistent memory, and wherein the instructions cause the machine to:
resume execution of the operation in response to the intermediate episode completing.

13. The non-transitory machine readable medium of claim 11, wherein the instructions cause the machine to:
transmit a response to a client device from which the operation originated in response to the final episode completing.

14. The non-transitory machine readable medium of claim 10, wherein the instructions cause the machine to:
accumulate actions into a first episode until a stopping point is triggered, wherein the stopping point corresponds to a point where if an additional action would be included within the first episode, then the consistent state could not be reconstructed in the event of the crash.

15. The non-transitory machine readable medium of claim 14, wherein the instructions cause the machine to:
trigger an accumulation of one or more additional actions, not accumulated into the first episode, into a second episode in response to the stopping point being triggered.

16. The non-transitory machine readable medium of claim 10, wherein the instructions cause the machine to:
create the set of episodes to comprise a minimum number of episodes.

17. A computing device comprising:
a memory comprising machine executable code for performing a method; and
a processor coupled to the memory, the processor configured to execute the machine executable code to cause the processor to:
identify a set of actions to commit to persistent memory of a node for executing an operation upon the persistent memory;
create an episode to comprise a first subset of actions of the set of actions that can be committed to the persistent memory in any order with respect to one another such that a consistent state of the persistent memory can be reconstructed in the event of a crash of the node during execution of the operation; and
commit the first subset of actions within the episode to the persistent memory and blocking further execution of the operation until the episode completes.

18. The computing device of claim 17, wherein the machine executable code causes the processor to:
include an action within the episode as an atom comprising an address at which the data is to be written within the persistent memory and a length of the data starting at the address.

19. The computing device of claim 17, wherein the machine executable code causes the processor to:
in response to rebooting from a failure of the node, reconstruct the persistent memory into the consistent state.

20. The computing device of claim 19, wherein the machine executable code causes the processor to:
utilizing a log, within which old data being overwritten by new data or the new data is logged, to reconstruct the persistent memory.

* * * * *